Sept. 19, 1961  J. RABINOW ET AL  3,000,262
PHOTOELECTRICALLY CONTROLLED REAR MIRROR
Filed Dec. 14, 1956

INVENTORS
Jacob Rabinow
Arthur O. Morse
BY Max L. Libman
Attorney

United States Patent Office 3,000,262
Patented Sept. 19, 1961

3,000,262
PHOTOELECTRICALLY CONTROLLED
REAR MIRROR
Jacob Rabinow, 1603 Drexel St., Takoma Park, Md., and Arthur O. Morse, 11105 Brandywind St., Kensington, Md.; said Rabinow assignor of fifteen percent to Max L. Libman, Vienna, Va.
Filed Dec. 14, 1956, Ser. No. 628,404
2 Claims. (Cl. 88—77)

This invention relates to a rearview mirror for automobiles and has for its primary object the provision of a rearview mirror in which reflection from bright headlights coming through the rear window of the vehicle can be automatically controlled without any attention on the part of the driver.

Rearview mirrors having controllable effective reflectance are well-known in the art, such mirrors being adjustable by the operator so that when the intensity of light reflected from the following car is too bright, it can be diminished by interposing a semi-translucent barrier so that only a small percentage of the light coming through the rear window will be reflected into the driver's eyes. However, under normal conditions of driving, with the barrier interposed, the rearview mirror is practically ineffective for ordinary purposes. Nethertheless, as the headlights of modern cars continue to increase in intensity, the need for control of rearview glare continues to grow. While it is true that properly adjusted headlights on a level road do not increase the intensity into the driver's eyes by his rearview mirror, at least two main effects mitigate against ideal conditions. One is that the lights are not always properly adjusted, and the second is that the roads are very seldom perfectly level.

It is a primary object of the invention to provide a system of one or more photocells mounted near the mirror so as to be effective by the same light which strikes the mirror, and arranged to operate an electromagnetic or suitable actuator by means of which the mirror can be controlled so as to vary its reflective power.

Another object is to provide a new and improved rearview mirror, having means for controlling its reflective power through a wide, graduated range.

Still another object is to provide automatic means for controlling the reflective power of a rearview mirror so as to prevent annoyance to the driver from the bright headlights of a following car, while providing also maximum rearview sensitivity under all normal driving conditions.

Figure 1:
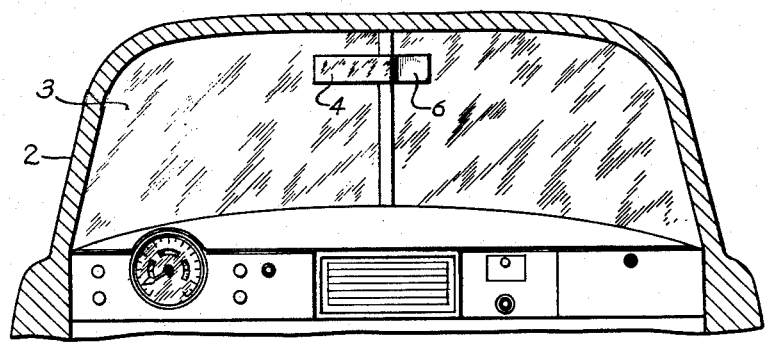
Figure 2:
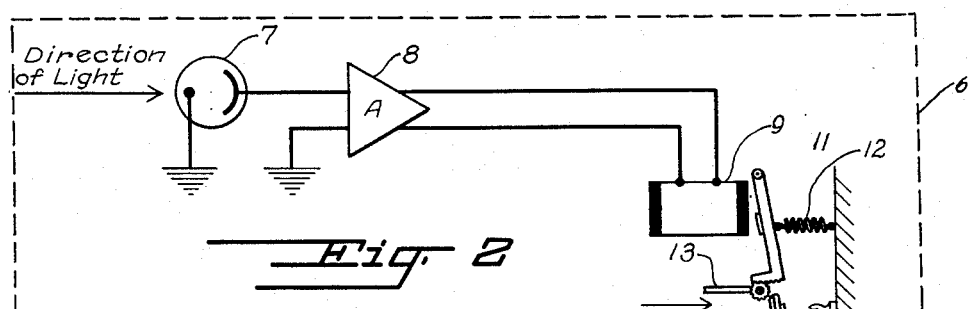
Figure 3:
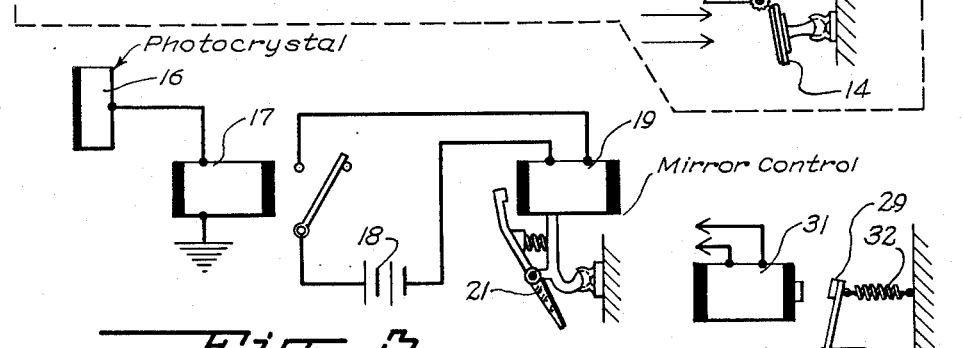
Figure 4:
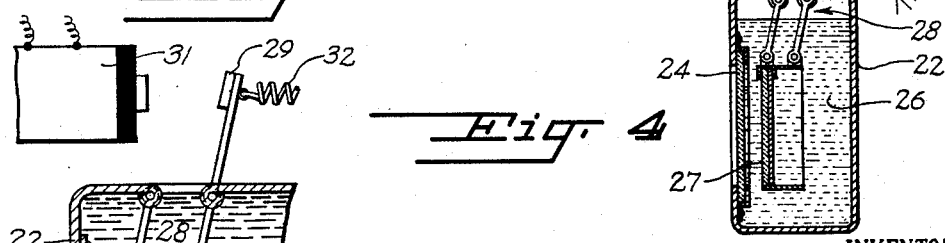
Figure 5:
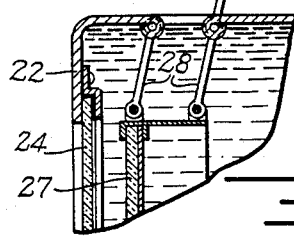

The specific nature of the invention as well as other objects and advantages thereof will clearly appear from a description of a preferred embodiment as shown in the accompanying drawing, in which:

FIG. 1 is a schematic view showing the windshield of an automobile and the location of the rearview mirror and photocell housing;
FIG. 2 is a schematic circuit diagram of the invention;
FIG. 3 is a schematic diagram of an alternative circuit according to the invention;
FIG. 4 is a schematic sectional view of a mirror automatically controllable to vary its reflective power through a wide range; and
FIG. 5 is an enlarged detail view of a portion of FIG. 4.

Referring to FIG. 1, the top of an automobile 2 is depicted, having a windshield 3. Near the top of the windshield area, in the usual position, is a rearview mirror 4, attached to which at one end thereof is a photocell housing 6, which may be used not only for the photocell housing, but also for all of the mechanism and circuitry described below.

Referring to FIG. 2, a light-sensitive element is shown at 7, which may be a photocell of any suitable type, such as a vacuum or gas photocell, or a lead sulphide or cadmium sulphide cell, or even a photo transistor. Since the amount of light falling on the mirror is quite considerable when the headlights of a following car illuminate it even from a distance of several hundred feet, the photocell need not be of extremely high sensitivity, nor need its speed or response be extremely rapid; a large fraction of a second would be acceptable, and for this purpose a lead sulphide cell of the type manufactured by the Eastman Kodak Co., for example, would be entirely suitable. The output of the cell is connected to any suitable amplifier 8, and the amplified output is used to control an electric motor device, which for the present application may simply be a powerful solenoid 9, having an armature 11. This armature is normally restrained in the position shown by spring 12, but when the magnet is energized, the armature is drawn toward the magnet and actuates any suitable anti-glare device for a rear mirror, schematically represented as a translucent shield 13 which is interposed before the rearview mirror 14. Various types of antiglare devices for rearview mirrors are currently available and in use in many automobiles, for manual actuation by the driver whenever he is annoyed by the reflection of bright headlights from a following car. Any of these manually operated devices can be equipped to be motor driven, and although we show a particular device for this purpose in FIGS. 4 and 5, it is within the purview of the present invention to utilize any known type of adjustable anti-glare rearview mirror.

Instead of using the electronic amplifier 8 of FIG. 2, it is possible to dispense with the need for the high-voltage supply by using a photocrystal 16, as shown in FIG. 3, which directly produces an electrical output when actuated by light of sufficient intensity, to operate a very sensitive relay 17. This may be a sensitive relay of the moving coil type, and such relays are available which can operate contacts on no more than a microampere of energizing current, which is well within the output capabilities of photocrystal 16. Sensitive relay 17 is used to close a circuit from battery 18, which may be the automobile battery, through an ordinary solenoid motor 19, which may operate the rearview mirror anti-glare control as before. In this case, the mirror 21 is shown as wedge-shaped, and when tilted, the reflection seen by the driver is a dim one from the front surface of the mirror. This is a commercially available device, not per se a part of the present invention. Since the voltage available in the modern car is generally 12 volts, transistor amplifiers may be used directly with the photocell output, thus also eliminating the need for a high-voltage power supply, but such systems would generally be more expensive than the one shown in FIG. 3.

FIGS. 4 and 5 show a mirror control particularly adapted to be used with the system of our invention. A fluid-tight housing 22 is provided with a front window 24 made of clear glass. The enclosure is filled with a liquid 26 of the proper light-transmitting value so that light transmitted through the liquid is partly absorbed as a function of the distance it travels through the liquid. Immersed in this liquid is a mirror 27 which is movably supported by a parallel linkage 28 attached to an armature 29 so that as the armature is moved to the left in FIG. 4 the mirror 27 moves away from the glass 24 while remaining parallel thereto. Thus a constant distance is maintained between all points of the glass and mirror although they may be separated by a variable amount. In the position shown in FIG. 4, there is only a very thin layer of liquid between the glass window 24 and the mirror 27, and the optical density of the liquid 26 is so selected that no appreciable diminution of intensity of light reflected on the mirror occurs due to the small distance which the light travels through the liquid. However, when the solenoid 31 is energized to attract the armature 29, mirror 27 is moved back a sufficient distance through the fluid to effectively reduce the glare of transmitted light due to the greater amount of liquid between window 24 and mirror 27. Armature 29 is attracted by solenoid 31 with a force which is proportional to the current flow through the solenoid, and this in turn can readily be made a function of the light received by the photocell so that the more intense the headlights of the following vehicle, the more this light is attenuated by the mirror. In this way, the intensity of the light reflected by the mirror can be maintained substantially constant, and thus the mirror remain at optimum efficiency.

It will be apparent that the embodiments shown are only exemplary and that various modifications can be made in construction and arrangement within the scope of our invention as defined in the appended claims.

We claim:

1. A self-contained automatic rearview mirror for automotive vehicles comprising a housing, a rearview mirror mounted in said housing, means for adjustably mounting said housing on a vehicle, photo-electric means mounted in said housing and oriented to receive light from substantially the same field of view as the mirror, anti-glare means operable to change the reflectance of said mirror mounted in said housing, said last means being movable into at least two alternative positions corresponding respectively to glare and non-glare condition, electric motor means mounted in said housing for operating said anti-glare means, said photo-electric means being responsive to the intensity of light from the same field of view as that seen by the mirror to produce a signal of amplitude related to said light intensity, and circuit means in said housing controlled by said signal for actuating said motor means to move the mirror to the non-glare condition when the light from said field of view exceeds a predetermined amount, and to return the mirror to the other position when the light from the field of view is below a predetermined amount, said anti-glare means comprising a liquid-tight casing having a transparent wall, a partially light-absorbing liquid in said casing, said mirror being located in said casing opposite said transparent wall, said motor means comprising means for changing the distance between said mirror and said wall.

2. The invention according to claim 1, said photocell means producing a signal which is a proportional function of the received light, and said motor means being arranged to change said distance as a function of said signal.

References Cited in the file of this patent

UNITED STATES PATENTS

| | | |
|---|---|---|
| 1,195,757 | Wertz | Aug. 22, 1916 |
| 1,887,706 | Bettman | Nov. 15, 1932 |
| 1,909,526 | Falge | May 16, 1933 |
| 1,913,874 | Folberth | June 13, 1933 |
| 2,003,248 | Chilowsky | May 28, 1935 |
| 2,070,434 | Kanges | Feb. 9, 1937 |
| 2,134,414 | Norcross | Oct. 25, 1938 |
| 2,375,677 | Moore | May 8, 1945 |
| 2,640,866 | Powell | June 2, 1953 |